US012646987B2

(12) United States Patent
Benedict et al.

(10) Patent No.: US 12,646,987 B2
(45) Date of Patent: Jun. 2, 2026

(54) COMPOSITE STRUCTURES FOR ELECTRIC MOTORS

(71) Applicant: The Texas A&M University System, College Station, TX (US)

(72) Inventors: Moble Benedict, College Station, TX (US); Chase B. Wiley, Keller, TX (US); Bansi Jayesh Patel, Bryan, TX (US); Karanveer Shyamdhar Dubey, College Station, TX (US)

(73) Assignee: The Texas A&M University System, College Station, TX (US)

( * ) Notice: Subject to any disclaimer, the term of this patent is extended or adjusted under 35 U.S.C. 154(b) by 218 days.

(21) Appl. No.: 18/377,688

(22) Filed: Oct. 6, 2023

(65) Prior Publication Data

US 2024/0120789 A1 Apr. 11, 2024

Related U.S. Application Data

(60) Provisional application No. 63/414,373, filed on Oct. 7, 2022.

(51) Int. Cl.
| | |
|---|---|
| *H02K 1/28* | (2006.01) |
| *H02K 1/14* | (2006.01) |
| *H02K 1/18* | (2006.01) |
| *H02K 1/2795* | (2022.01) |
| *H02K 21/24* | (2006.01) |

(52) U.S. Cl.
CPC .............. *H02K 1/28* (2013.01); *H02K 1/146* (2013.01); *H02K 1/182* (2013.01); *H02K 1/2795* (2022.01); *H02K 21/24* (2013.01)

(58) Field of Classification Search
CPC .. H02K 1/2793; H02K 1/2795; H02K 1/2796; H02K 1/2798; H02K 21/026; H02K 1/146; H02K 1/182; H02K 21/16; H02K 21/24; H02K 1/28
USPC ...................................... 310/156.32
See application file for complete search history.

(56) References Cited

U.S. PATENT DOCUMENTS

| | | | | |
|---|---|---|---|---|
| 11,804,742 B2 * | 10/2023 | Mayeur | ................... | H02K 1/02 |
| 2018/0219441 A1 * | 8/2018 | Thiele | ................... | H02K 1/146 |
| 2018/0346668 A1 * | 12/2018 | Ichikawa | ........... | D06M 13/148 |
| 2023/0124875 A1 * | 4/2023 | Kumar | ................... | H02K 21/24 |
| | | | | 310/65 |
| 2024/0195245 A1 * | 6/2024 | Odling | ................... | H02K 21/24 |

FOREIGN PATENT DOCUMENTS

WO WO-2010040535 A1 * 4/2010 ........... H02K 1/2796

OTHER PUBLICATIONS

Schottdorf et al., Bearing Device for a Rotor and a Shaft of an Electric Motor, Apr. 15, 2010, WO 2010040535 (English Machine Translation) (Year: 2010).*

* cited by examiner

*Primary Examiner* — Alexander A Singh
(74) *Attorney, Agent, or Firm* — Conley Rose, P.C.

(57) ABSTRACT

A composite rotor for an electric motor includes an annular composite support plate extending radially relative a central axis of the composite rotor between an inner diameter defining a central opening of the composite support plate and an outer diameter, wherein the composite support plate includes a quasi-isotropic composite material, and an annular magnet assembly extending around the central axis of the composite rotor and coupled to a surface of the composite support plate.

20 Claims, 9 Drawing Sheets

100

110          112

116          103

150          133

130          131

140          113

145          132

190          195

192

194

192

194

COMPOSITE STRUCTURES FOR ELECTRIC MOTORS

CROSS-REFERENCE TO RELATED APPLICATIONS

This application claims benefit of U.S. provisional patent application Ser. No. 63/414,373 filed Oct. 7, 2022, and entitled "Composite Rotors for Electric Motors," which is hereby incorporated herein by reference in its entirety for all purposes.

STATEMENT REGARDING FEDERALLY SPONSORED RESEARCH OR DEVELOPMENT

This invention was made with government support under DE-AR0001356 awarded by the Advanced Research projects Agency-Energy (ARPA-E). The government has certain rights in the invention.

BACKGROUND

Electric motors transform electrical energy supplied to the electric motor into mechanical energy such as mechanical torque or rotation that is applied to a mechanical output of the electric motor, such as an output shaft of the electric motor. Electric motors generally include a stator and a rotor each comprising one or more magnets configured to generate a magnetic flux between the stator and rotor in response to the electric motor receiving electrical energy, whereby the generation of the magnetic flux causes the rotor to rotate relative to the stator about a rotational axis of the electric motor.

Generally, electric motors may comprise either axial-flux electric motors or radial-flux electric motors. Axial-flux electric motors space the stator and rotor along a longitudinal axis of the electric motor whereby the magnetic flux produced by the axial-flux electric motor extends parallel to the longitudinal axis of the electric motor. Conversely, radial-flux electric motors space the stator and rotor radially relative to a longitudinal axis of the electric motor whereby the magnetic flux generated by the radial-flux electric motor extends radially relative to the longitudinal axis.

BRIEF SUMMARY OF THE DISCLOSURE

An embodiment of a composite rotor for an electric motor comprises an annular composite support plate extending radially relative a central axis of the composite rotor between an inner diameter defining a central opening of the composite support plate and an outer diameter, wherein the composite support plate comprises a quasi-isotropic composite material, and an annular magnet assembly extending around the central axis of the composite rotor and coupled to a surface of the composite support plate. In some embodiments, the quasi-isotropic composite material comprises one or more first plies oriented at a first angle relative a layup axis of the quasi-isotropic composite material and one or more second plies stacked sandwiched between the one or more first plies along the layup axis and oriented at a second angle relative to the layup axis that is different from the first angle. In some embodiments, the first angle comprises 0° and the second angle comprises 45°. In certain embodiments, the composite support plate comprises a spokeless external surface extending circumferentially entirely around the central axis and entirely from the inner diameter to the outer diameter, and wherein the external surface is free of any openings. In certain embodiments, the composite support plate comprises a first composite support plate of the composite rotor and the quasi-isotropic composite material comprises a first quasi-isotropic composite material, the composite rotor further comprises an annular second composite support plate coupled to the first composite support plate and extending radially between an inner diameter defining a central opening of the second composite support plate and an outer diameter of the second composite support plate, wherein the second composite support plate comprises a second quasi-isotropic composite material, and an annular chamber is formed between the first composite support plate and the second composite support plate that extends circumferentially entirely around the central axis of the composite rotor. In some embodiments, the chamber is filled with an annular foam core. In some embodiments, the magnet assembly comprises an annular mounting bracket, an annular retaining ring, and one or more magnets positioned radially between the mounting bracket and the retaining ring. In certain embodiments, the retaining ring comprises a unidirectional composite material. In certain embodiments, the quasi-isotropic composite material comprises carbon fiber. In some embodiments, the composite rotor comprises an annular composite support frame that includes the composite support plate, wherein the support frame defines a plurality of spokes circumferentially spaced around the central axis of the composite rotor.

An embodiment of a composite stator for an electric motor comprises an annular composite support ring extending radially relative a central axis of the composite stator between an inner diameter defining a central opening of the composite support ring and an outer diameter, wherein the composite support ring comprises a quasi-isotropic composite material, and an annular electromagnet assembly extending around the central axis of the composite stator and coupled to a surface of the composite support ring. In some embodiments, the composite support ring comprises a plurality of slots circumferentially spaced around the central axis of the composite stator, and the electromagnet assembly comprises a plurality of electromagnets circumferentially spaced around the central axis of the composite stator, wherein each electromagnet comprises an outer electrically conductive winding and an inner stator tooth comprising a first key that is received in a slot of the plurality of slots of the composite support ring. In certain embodiments, the composite support ring comprises a first composite support ring of the composite stator and the quasi-isotropic composite material comprises a first quasi-isotropic composite material, and the composite stator further comprises an annular second composite support ring whereby the electromagnet assembly is coupled between the first composite support ring and the second composite support ring, wherein the second composite support ring extends radially between an inner diameter defining a central opening of the second composite support ring and an outer diameter of the second composite support ring, and wherein the second composite support ring comprises a second quasi-isotropic composite material. In certain embodiments, the second composite support ring comprises a plurality of slots circumferentially spaced around the central axis of the composite stator, and wherein the stator tooth of each electromagnet of the electromagnet assembly comprises a second key, longitudinally opposite the first key of the stator tooth, that is received in a slot of the plurality of slots of the second composite support ring. In some embodiments, the composite support ring comprises a plurality of mounting tabs positioned along the inner diameter and circumferentially spaced around the central axis of the composite stator. In some embodiments, the quasi-isotropic composite material comprises a mixture of continuous fibers and discontinuous fibers. In certain embodiments, the quasi-isotropic composite material comprises an epoxy resin having a working temperature of up to at least 500 degrees Fahrenheit. In certain embodiments, the quasi-isotropic composite material comprises one or more first plies oriented at a first angle relative a layup axis of the quasi-isotropic composite material and one or more second plies stacked sandwiched between the one or more first plies along the layup axis and oriented at a second angle relative to the layup axis that is different from the first angle.

An embodiment of an electric motor comprises an annular composite rotor comprising an annular composite support plate and an annular rotor magnet assembly coupled to the composite support plate, an annular composite stator comprising a pair of annular composite support rings and a stator electromagnet assembly coupled between the pair of composite support rings, and an output shaft defining a rotational axis of the electric motor and extending through the composite stator and the composite rotor, wherein the output shaft is permitted to rotate about the rotational axis relative to the composite stator but is rotationally locked to the composite rotor, wherein the electric motor is configured to generate a magnetic flux between the stator electromagnet assembly and the rotor magnet assembly to drive rotation of the output shaft about the rotational axis. In some embodiments, both the composite rotor and the composite stator comprise a quasi-isotropic composite material.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of exemplary embodiments of the disclosure, reference will now be made to the accompanying drawings in which.

DETAILED DESCRIPTION OF THE DISCLOSED EMBODIMENTS

Figure 1:
FIG. 1 is a schematic view of a radial-flux electric motor according to some embodiments.
Figure 1:
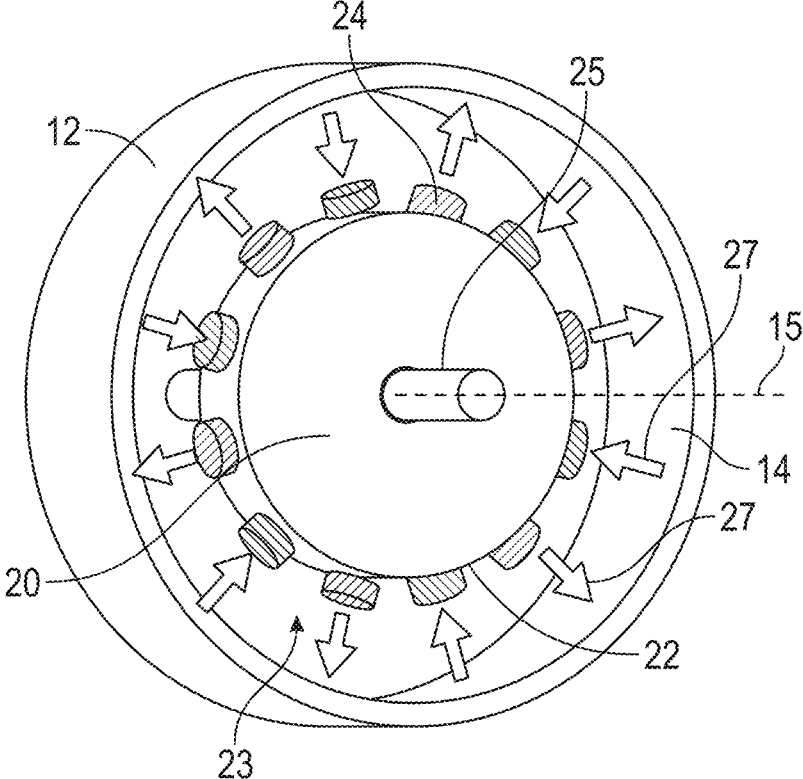

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

As described above, electric motors, including both axial-flux and radial-flux electric motors, are generally configured to transform electrical energy supplied to the electric motor into mechanical energy such as mechanical torque or rotation that is applied to a mechanical output of the electric motor, such as an output shaft of the electric motor. Electric motors are utilized in a variety of applications in which mechanical energy is required. In some applications (e.g., aerospace applications), it is often desirable to decrease the minimize the mass of the electric motor so as to minimize the overall mass of the given aerospace structure. Owing to their mass-specific performance (e.g., strong, stiff, light-weight), composites (e.g., carbon fiber composites), ceramics, and metals are often used to form aerospace structures as opposed to elastomers and polymers.

Unlike metallic alloys which, being blended together homogenously, are typically isotropic (e.g., the Young's Modulus and Yield Strengths are consistent irrespective of orientation), composite materials are often not isotropic and instead are orthotropic. However, the critical components of electric motors (e.g., the stator, rotor) are exposed to loads in varying directions including centrifugal loads and bending loads. For instance, bending loads may result via the force of attractions between the magnets of the rotor and stator of the electric motor while centrifugal loads may result due to the rotation of the rotor about a rotational axis. Although at least some composite materials demonstrate better mass-specific performance than many metallic alloys, this multi-directional loading often prevents the use of composite materials (which are often not isotropic) in forming many of the critical components of electric motors given their susceptibility to failure when exposed to such multi-direction loading. Instead, conventional materials such as metallic alloys are generally used to form rotors, stators, and other critical components of electric motors.

Accordingly, embodiments of electric motors (e.g., axial-flux and radial-flux electric motors) are described herein which comprise one or more components formed from composite materials so as to enhance the mass-specific performance of the electric motor. Such composite components described herein include composite rotors as well as composite stator support structures. The composite materials of the electric motors are designed so as to be quasi-isotropic such that the composite materials exhibit generally consistent strength irrespective of the direction of the load applied to the quasi-isotropic composite material. As used herein, the term "quasi-isotropic composite material" refers to a material having isotropic properties within the plane of the material. In other words, a quasi-isotropic composite material is a material having strength and stiffness that are equal in all directions within the plane of the material. This quasi-isotropic behavior of the composite materials described herein makes them particularly advantageous for use in applications in which multi-directional loads are encountered, including components of electric motors exposed to both centrifugal and bending loads.

Quasi-isotropic composite materials described herein include laminate materials having n-ply groups spaced 180°/n degrees such that each direction has an equal number of plies. For example, in an embodiment, there are an equal number of composite plies oriented at 0°, 45°, −45°, and 90° that create a laminate with symmetric and balanced material properties in-plane. By arranging each composite ply (e.g., each carbon fiber ply) in a particular orientation such that the resulting laminate projects isotropic properties in-plane, the tendency of composite laminate to exhibit uneven distribution of strength in different directions may be overcome.

Embodiments of electric motors disclosed herein include both axial-flux electric motors and radial-flux electric motors comprising composite components. Particularly, embodiments of composite rotors and composite stators for electric motors (axial-flux or radial-flux) are described herein. The composite rotors and composite stators described herein comprise quasi-isotropic composite materials such as quasi-isotropic carbon fiber materials which permit the composite rotor and composite stator to endure the multi-directional loads applied thereto during operation of the electric motor. In this manner, the embodiments of composite rotors and composite stators described herein provide superior mass-specific performance over conventional rotors and stators comprising relatively heavier metallic alloys.

Referring now to FIG. 1, an embodiment of a radial-flux electric motor 10 is shown. Electric motor 10 generally includes an annular outer stator 12 and a radially inner rotor 20 that is rotatable relative to the stator 12 about a rotational axis 15 of the electric motor 10. Particularly, stator 12 of electric motor 10 includes an annular radially inner surface 14 along which are positioned stator magnets (e.g., electromagnets) circumferentially spaced around the rotational axis 15. In addition, the rotor 20 of electric motor 10 is disk-shaped and includes an annular radially outer surface 22 along which are positioned rotor magnets 24 circumferentially spaced around the rotational axis 15. Electric motor 10 additionally includes an output shaft 25 coupled to the rotor 20 and extending along the rotational axis 15 whereby an output torque produced by the electric motor 10 is applied to the output shaft 25.

In this configuration, the stator magnets of stator 12 and the rotor magnets 24 of rotor 20 overlap along rotational axis 15 whereby an annular, radially extending gap 23 is formed between the stator magnets and the rotor magnets 24. Radially directed (e.g., extending radially or orthogonal to relative rotational axis 15) magnetic flux 27 may be generated between the stator magnets positioned along the inner surface 14 of stator 12 and the rotor magnets 24 positioned along the outer surface 22 of rotor 20 whereby rotational torque is applied to the rotor 20 about the rotational axis 15. This rotational torque may be transferred from the rotor 20 to the output shaft 25 for powering the rotation of a driven component coupled to the electric motor 10 (e.g., a pump, a compressor, an actuator).

Figure 2:
FIG. 2 is a schematic view of an axial-flux electric motor according to some embodiments.
Figure 2:
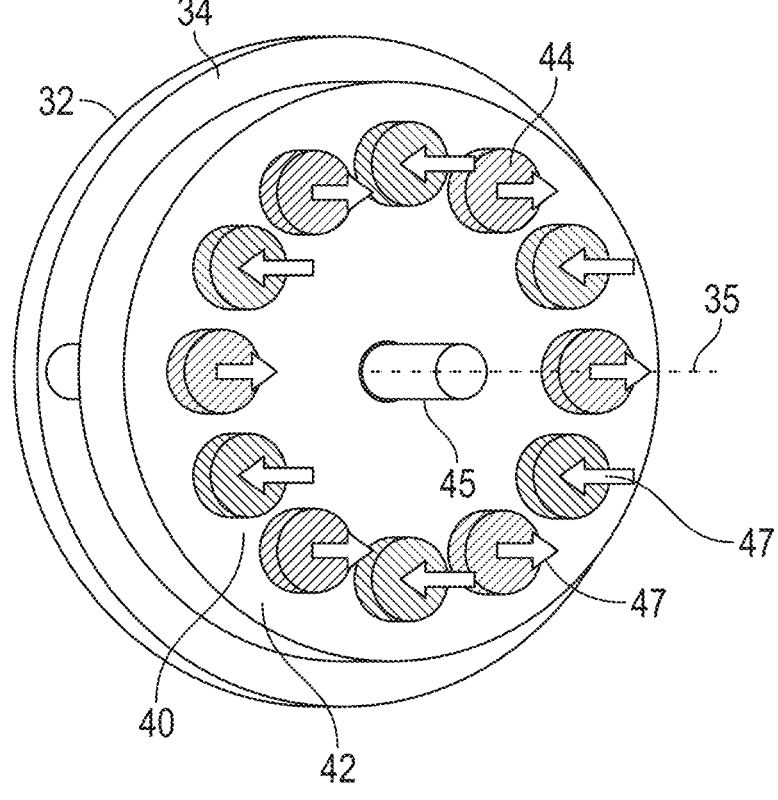

Referring to FIGS. 1 and 2, an embodiment of an axial-flux electric motor 30 is shown in FIG. 2. Electric motor 30 generally includes a disk-shaped stator 32 and a disk-shaped rotor 40 that is rotatable relative to the stator 32 about a rotational axis 35 of the electric motor 30. Particularly, stator 32 of electric motor 10 includes a pair of opposed stator endfaces 34 along at least one of which are positioned stator magnets circumferentially spaced around the rotational axis 35. The rotor 40 of electric motor 30 is spaced along rotational axis 35 from stator 32 and includes an endface 42 along which are positioned rotor magnets 44 circumferentially spaced around the rotational axis 35. Electric motor 30 additionally includes an output shaft 45 coupled to the rotor 40 and extending along the rotational axis 35 whereby an output torque produced by the electric motor 30 is applied to the output shaft 45.

Figure 3:
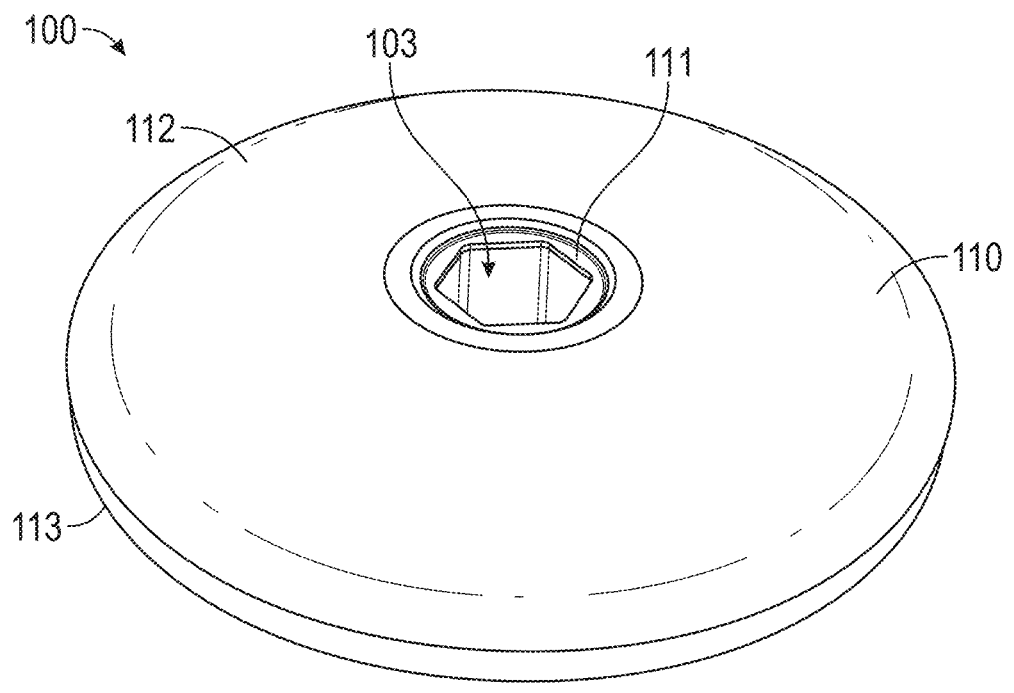
FIG. 3 is a perspective view of a composite rotor according to some embodiments.
Figure 4:
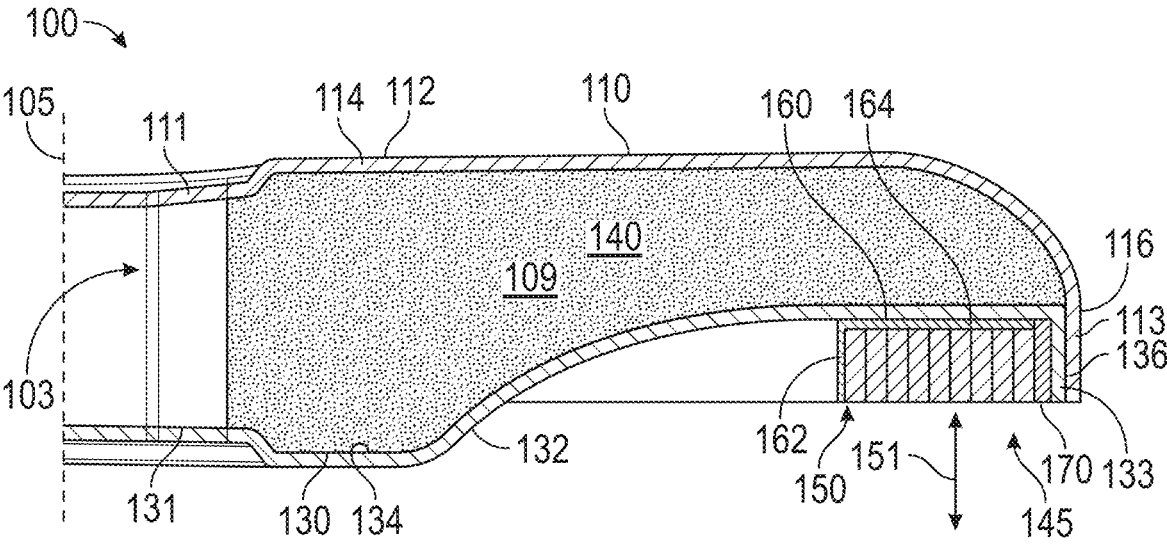
FIG. 4 is a side cross-sectional view of the composite rotor of FIG. 3.
Figure 5:
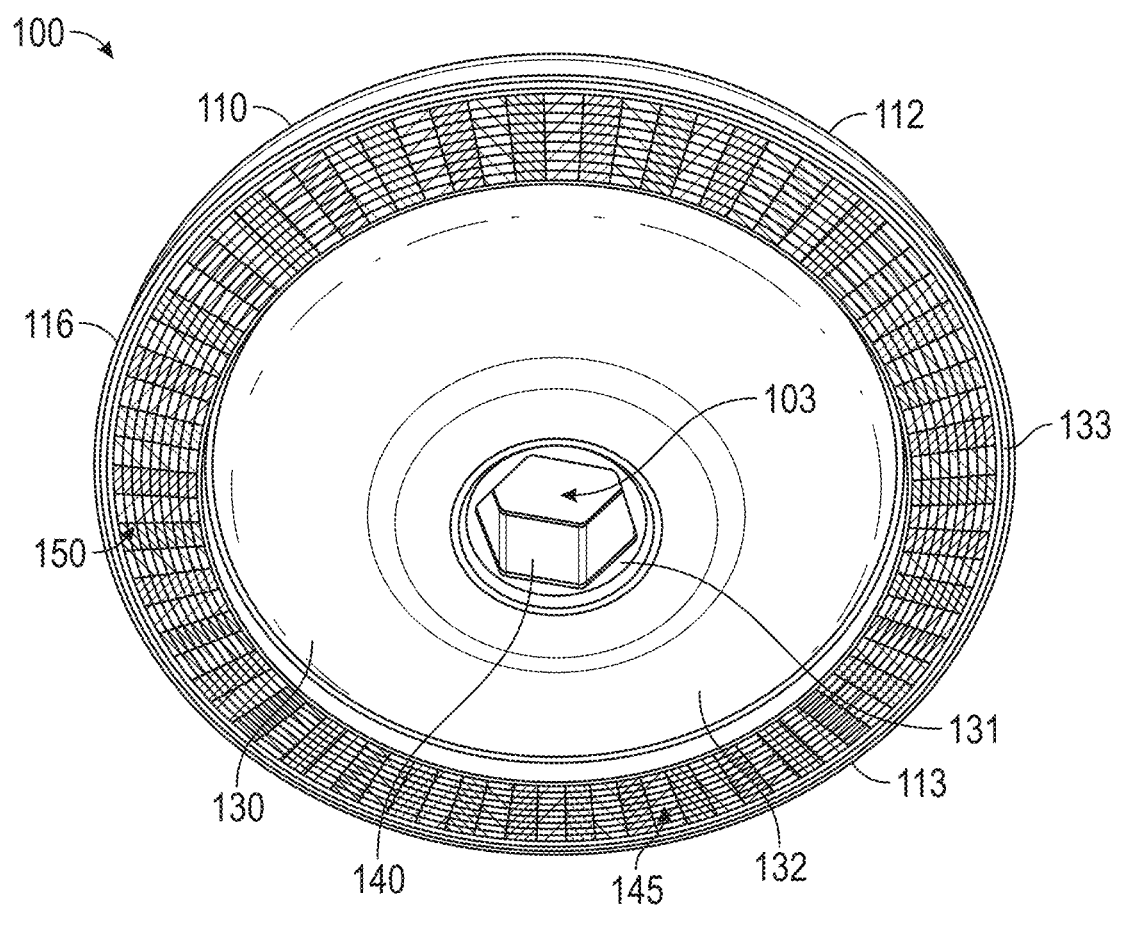
FIG. 5 is another perspective view of the composite rotor of FIG. 3.

Referring now to FIGS. 3-5, an embodiment of a composite rotor 100 of an electric motor is shown. Particularly, in this exemplary embodiment, composite rotor 100 comprises a rotor of an axial-flux electric motor. For instance, in some embodiments, composite rotor 100 comprises the rotor 40 of the axial-flux electric motor 30 shown in FIG. 2. However, it may be understood that in other embodiments the composite rotor 100 of FIGS. 3-5 could be utilized (e.g., via repositioning the magnets thereof) in radial-flux electric motors such as, for example, the radial-flux electric motor 10 shown in FIG. 1.

Composite rotor 100 has a longitudinal or central axis 105 which is coincident with the rotational axis of the electric motor comprising composite rotor 100. In addition, composite rotor 100 defines a central passage 103 extending centrally and longitudinally through composite rotor 100 coaxial with central axis 105. In this exemplary embodiment, central passage 103 has a hexagonal outer periphery to permit composite rotor 100 to rotationally lock the composite rotor 100 to an output shaft of an electric motor comprising composite rotor 100. In other embodiments, the composite rotor 100 may be splined to the output shaft using a metallic interface such as a spline, key, or other mechanism positioned along the periphery of central passage 103.

In this exemplary embodiment, composite rotor 100 generally includes an annular first or top support plate 110 and an annular second or bottom support plate 130 coupled to the top support plate 110. Particularly, top support plate 110 (also referred to herein as top shell 110) extends radially between a radially inner diameter 111 and an opposing radially outer diameter 113. Additionally, top support plate 110 defines an annular external surface or endface 112 and an opposing annular internal surface or endface 114 where each surface 112 and 114 extends radially between inner diameter 111 and outer diameter 113 of top support plate 110. In this exemplary embodiment, top support plate 110 curves moving radially towards the outer diameter 113 such that an annular and axially extending outer hub 116 of top support plate 110 is formed which defines the outer diameter 113 of top support plate 110.

The bottom support plate 130 (also referred to herein as bottom shell 130) extends radially between a radially inner diameter 131 and an opposing radially outer diameter 133. Additionally, bottom support plate 130 defines an annular external surface or endface 132 and an opposing annular internal surface or endface 134 where each surface 132 and 134 extends radially between inner diameter 131 and outer diameter 133 of bottom support plate 130. In this exemplary embodiment, an annular and axially extending outer hub 136 of bottom support plate 130 is formed along the outer diameter 133 thereof.

In this exemplary embodiment, both the top support plate 110 and bottom support plate 130 extend continuously and uninterruptedly around the central axis 105 of composite rotor 100. In other words, both top support plate 110 and bottom support plate 130 are bereft of openings formed therein (e.g., openings formed between circumferentially spaced spokes) between the inner radii 111, 131 and outer radii 113, 133 thereof. This spoke-less configuration of support plates 110 and 130 may minimize the complexity and cost associated with forming support plates 110 and 130 during the manufacturing of composite rotor 100—in-turn minimizing the overall costs associated with manufacturing composite rotor 100.

In this exemplary embodiment, the outer hub 116 of top support plate 110 is positioned radially over the outer hub 136 of bottom support plate 130 whereby the outer diameter 113 of top support plate 110 defines a maximum outer diameter of composite rotor 100. In addition, the outer hub 116 of top support plate 110 is coupled to the outer hub 136 of bottom support plate 130 whereby an annular opening or channel 109 is formed axially between the support plates 110 and 130. In some embodiments, a metallic annular hub is positioned along the inner radii 111 and 131 of support plates 110 and 130 to assist in securing the support plates 110 and 130. In addition, support plates 110 and 130 may be bonded together (e.g., using an epoxy resin) during the manufacture of composite rotor 100.

Particularly, channel 109 extends axially between top support plate 110 and bottom support plate 130, and radially between an inner diameter of composite rotor 100 and the outer hub 116 of top support plate 110. In this exemplary embodiment, channel 109 of composite rotor 100 an annular core 140 is received within channel 109. Particularly, in this exemplary embodiment, core 140 comprises a foam core 140 which extends continuously around central axis 105 to increase the bending stiffness of composite rotor 100 at the expense of a minimal increase in weight of the composite rotor 100 due to the relatively low density of the foam material comprising foam core 140. In this exemplary material, the foam material comprising foam core 140 is a polymethacrylimide (PMI) structural foam having low density, high temperature resistance, and desirable mechanical properties; however, it may be understood that the type of foam used in foam core 140 may vary in other embodiments. In other embodiments, core 140 may comprise materials other than foam. For example, in some embodiments, core 140 may comprise a honeycomb or other structure formed from various materials including metallic alloys. In still other embodiments, composite rotor 100 may not include core 140 and instead channel 109 may be left empty.

In addition, foam core 140 increases the bending stiffness of composite rotor 100 without adding geometry complexity that may make composite rotor 100 more difficult or costly to manufacture. In conventional designs, a plurality of circumferentially spaced spokes are typically used to increase the ending stiffness of the rotor. However, forming the rotor with circumferentially spaced spokes or similar geometrically complex structures substantially increases the difficulty and cost in manufacturing the given rotor. In addition, the geometrically complex spokes, due to their difficulty of manufacture, often result in manufacture error or inconsistencies which may make the rotor unsuitable for its given purpose. Further, spokes also increase the weight of the rotor thereby reducing its mass-specific performance.

In addition to top support plate 110 and bottom support plate 130, in this exemplary embodiment, composite rotor 100 additionally includes a plurality of magnets 150 positioned circumferentially around the central axis 105 of composite rotor 100. Particularly, in this exemplary embodiment, magnets 150 is coupled to the external surface 132 of bottom support plate 130 via an annular mounting bracket 160 positioned axially between the magnets 150 and the external surface 132 of bottom support plate 130. Mounting bracket 160 has an L-shaped cross-section in this exemplary embodiment and includes an annular, axially extending shoulder 162 extending along and defining an inner diameter of the mounting bracket 160, and an annular radially extending mounting shoulder 164 which extends radially from the shoulder 162 to an outer diameter of the mounting bracket 160.

The mounting bracket 160 ensures the proper positioning of magnets 150 including the even distribution of magnets 150 around the central axis 105 of composite rotor 100. In some embodiments, magnets 150 may be initially prepositioned within an annular receptacle defined by the L-shaped cross-section of the mounting bracket 160 and then coupled (e.g., bonded using an epoxy resin) to the mounting bracket 160. In this manner, the shoulder 162 of mounting bracket 160 ensures the inner diameter of magnets 150 are positioned along a common or shared circumference. Following the bonding of magnets 150 to the mounting bracket 160, the assembly formed from mounting bracket 160 and magnets 150 is coupled to the external surface 132 of bottom support plate 130 proximal the outer diameter 133 of bottom support plate 130.

In some embodiments, magnets 150 are bonded axially to the mounting bracket 160 whereby the magnets 150 are each placed normal to the mounting bracket 160 in the axial direction. In other embodiments, magnets 150 are bonded radially to the mounting bracket 160 whereby the magnets 150 are each inserted in the radial direction pointing radially inwards towards a center of the mounting bracket 160. Additionally, in some embodiments, each magnet 150 are tapered (e.g., to form a wedge shape) to permit the magnets 150 to be positioned radially inwards.

In this exemplary embodiment, composite rotor 100 additionally includes an annular and axially extending retaining ring 170 that is positioned radially between an outer diameter of magnets 150 and the outer hub 136 of bottom support plate 130. Retaining ring 170 preserves the position of magnets 150 as the composite rotor 100 rotates about central axis 105 during operation (e.g., at high rotational speeds about central axis 105). Particularly, retaining ring 170 is configured to withstand hoop stresses applied by magnets 150 to retaining ring 170 in response to the centrifugal forces applied to magnets 150 as composite rotor 100 rotates about central axis 105. In this manner, retaining ring 170 shields the outer hubs 116 and 136 of support plates 110 and 130, respectively, from the hoop stresses imparted by magnets 150 during operation of composite rotor 100. In some embodiments, magnets 150 are initially bonded to the mounting bracket 160, the retaining ring 170 is then assembled with the mounting bracket 160, and finally the mounting bracket 160 and retaining ring 170 are coupled (e.g., bonded using an epoxy resin) to the bottom support plate 130.

In this manner, magnets 150, mounting bracket 160, and retaining ring 170 define an annular magnet assembly 145 of composite rotor 100 which is arranged on the external surface 132 of bottom support plate 130 in this exemplary embodiment. Positioned along external surface 132, the magnets 150 of magnet assembly 145 may generate an axially-directed magnetic flux 151 (e.g., extending parallel central axis 105) during operation of composite rotor 100. However, it may be understood that in other embodiments the magnet assembly 145 may be positioned along the outer hub 116 of top support plate 110 to provide a radially directed magnetic flux (e.g., extending orthogonal central axis 105) during operation of composite rotor 100. In addition, while composite rotor 100 is shown having a single magnet assembly 145, in other embodiments, composite rotor 100 may have more than one magnet assembly 145 such as a pair of magnet assemblies 145 coupled to support plates 110 and 130 as an example.

One or more components of composite rotor 100 are formed from composite materials. In this exemplary embodiment, support plates 110 and 130 each comprise a composite material. Particularly, support plates 110 and 130 comprise a quasi-isotropic composite material such as a quasi-isotropic carbon fiber material providing support plates 110 and 130 with the uniform stiffness required to handle the multi-directional loads (e.g., centrifugal and bending loads) applied to support plates 110 and 130 during operation of composite rotor 100. Particularly, the quasi-isotropic composite materials forming support plates 110 and 130 facilitate uniform load distribution to eliminate stress concentrations due to material layup.

Figure 6:
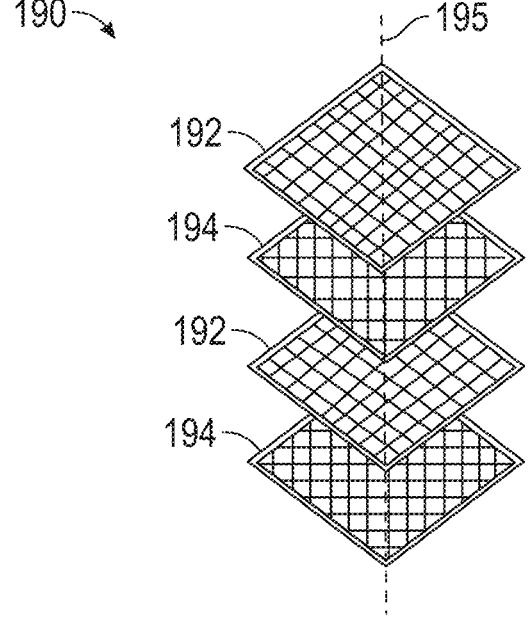
FIG. 6 is a schematic view of a composite layup according to some embodiments.
Figure 7:
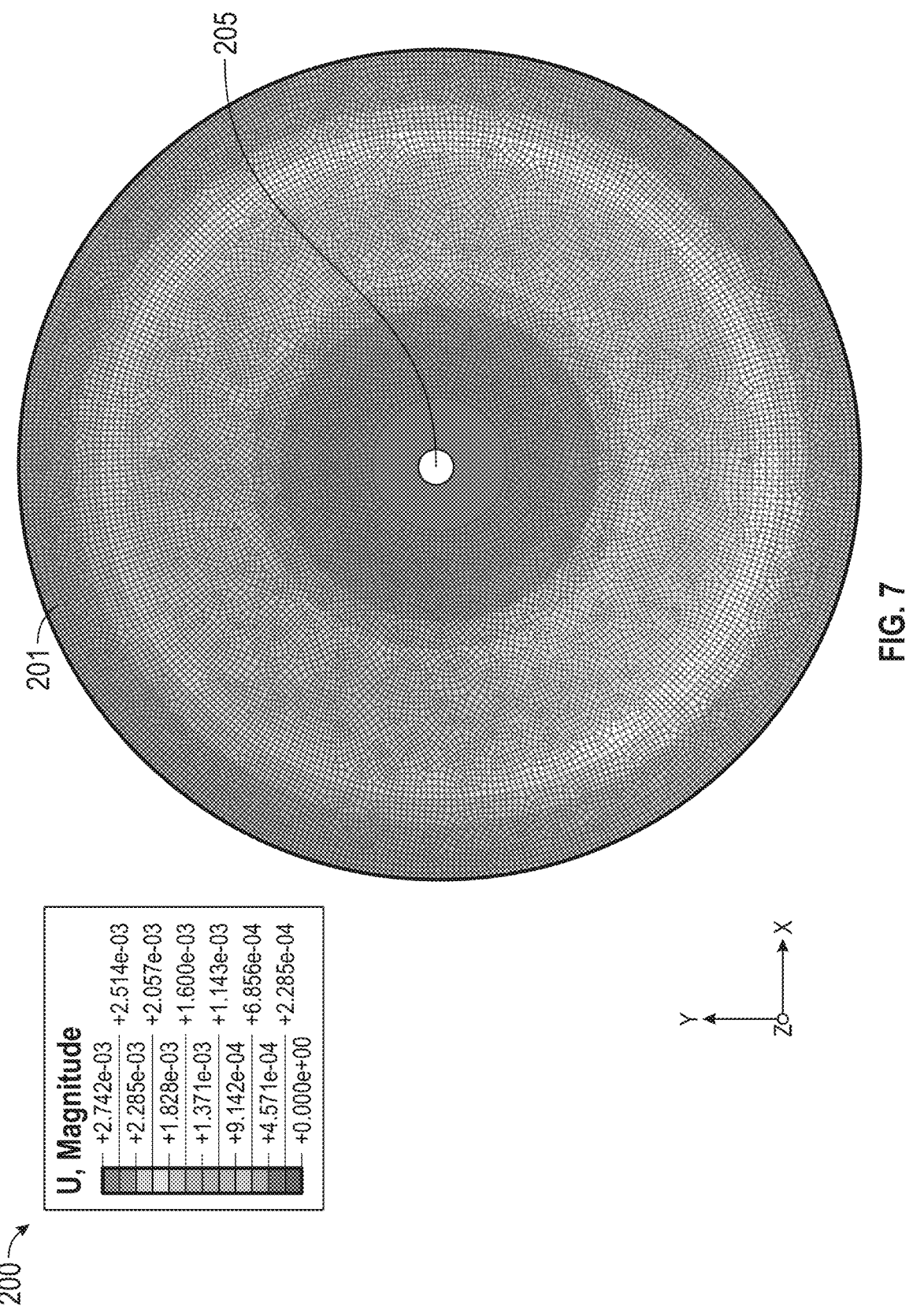
FIG. 7 is a simulation of deformation in a composite annular support plate of a rotor according to some embodiments.

In some embodiments, the composite material comprising support plates 110 and 130 comprises carbon fiber formed from a carbon fiber layup. Referring to FIGS. 6 and 7, a composite (e.g., carbon fiber) layup 190 is shown. Layup 190 comprises a plurality of layers of composite plies 192 and 194 stacked along a layup axis 195. Plies 192 and 194 each comprise an orthotropic composite material such as an orthotropic carbon fiber material. However, once the stacked plies 192 and 194 are bonded together (e.g., via a resin or other matrix material), the resulting composite material formed from stacked plies 192 and 194 is quasi-isotropic. This results from plies 194 of layup 190 being rotated approximately 45 degrees about layup axis 195 relative to plies 192. In this configuration, plies 192 are oriented in a 0° orientation while plies 194 are oriented in a 45° orientation with plies 194 sandwiched between plies 192 along the layup axis 195. Although a pair of plies 192 and a corresponding pair of plies 194 are shown in FIG. 6, it may be understood that the number of plies 192 and/or 194 and their orientations relative layup axis 195 of the composite material may vary depending on the given application.

FIG. 7 illustrates an exemplary simulation 200 of deformation (in units of meters) in an annular support plate 202 (e.g., one of support plates 110 and 130) comprising a quasi-isotropic composite material (e.g., composite material formed from the layup 190 shown in FIG. 6) as the support plate 202 (which forms part of a rotor of an electric motor) is subjected to simulated loads during operation (e.g., simulated loads encountered during operation of an electric motor comprising the support plate 202). Particularly, the simulated loading condition of support plate 202 includes an axial force applied on an endface of the support plate 202 where magnets are to be positioned, resulting in simulated bending (due to the magnetic force of attraction) of the support plate 202. As indicated in simulation 200, deformation in support plate 202 is distributed evenly along the circumference of support plate 202. In other words, in the simulation 200, deformation in support plate 202 is not concentrated at any particular circumferential location therealong and instead is evenly distributed circumferentially about a central axis 215 of the support plate 202.

Returning to FIGS. 3-5, support plates 110 and 130 comprise a composite material such a carbon fiber material that is quasi-isotropic. In some embodiments, the composite material comprising support plates 110 and 130 may be formed from a layup similar in configuration to the composite layup 190 shown in FIG. 5. In addition to support plates 110 and 130, in some embodiments, retaining ring 170 is also formed from a composite material such as a carbon fiber material. For example, retaining ring 170 may comprise a composite material formed from a unidirectional composite layup configured particularly to withstand the centrifugal loads applied to retaining ring 170 during the operation of composite rotor 100. In certain embodiments, mounting bracket 160 may also comprise a composite material such as a carbon fiber material such that the only metallic component of composite rotor 100 are the magnets 150.

Figure 8:
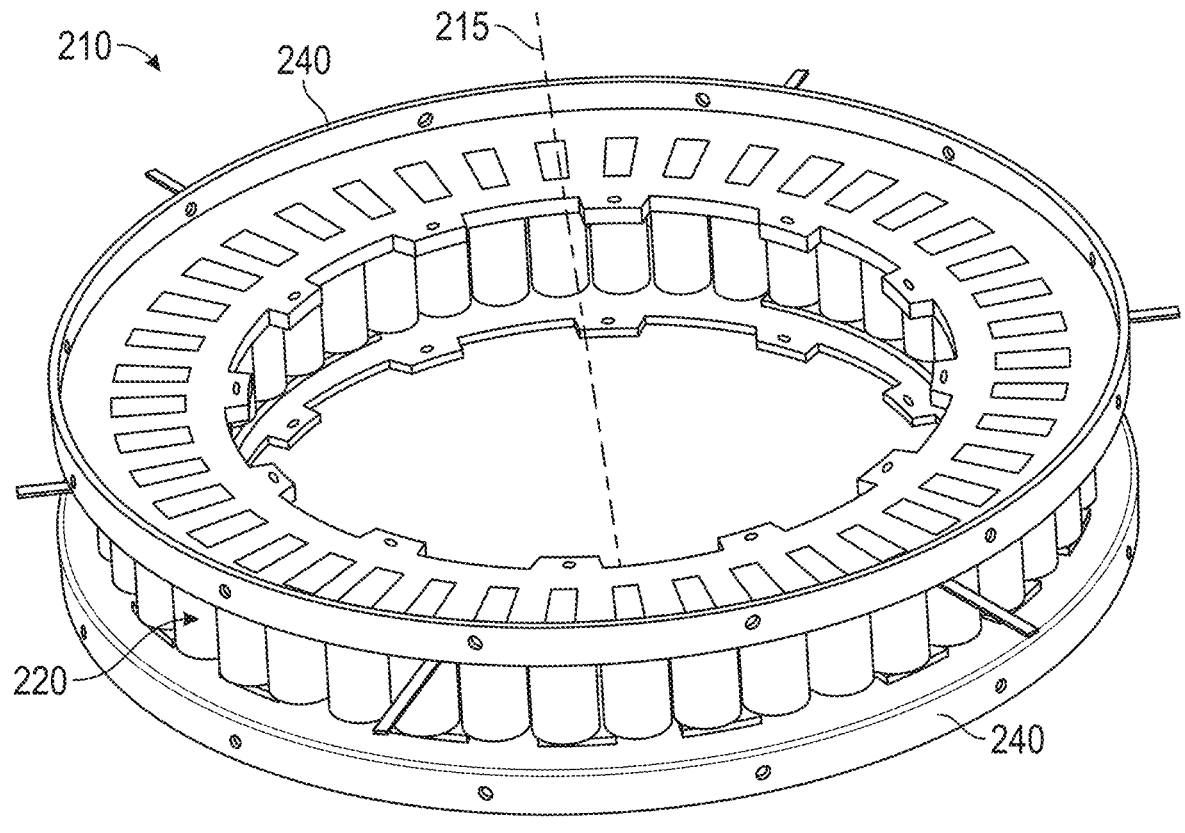
FIG. 8 is a perspective view of a composite stator according to some embodiments.
Figure 9:
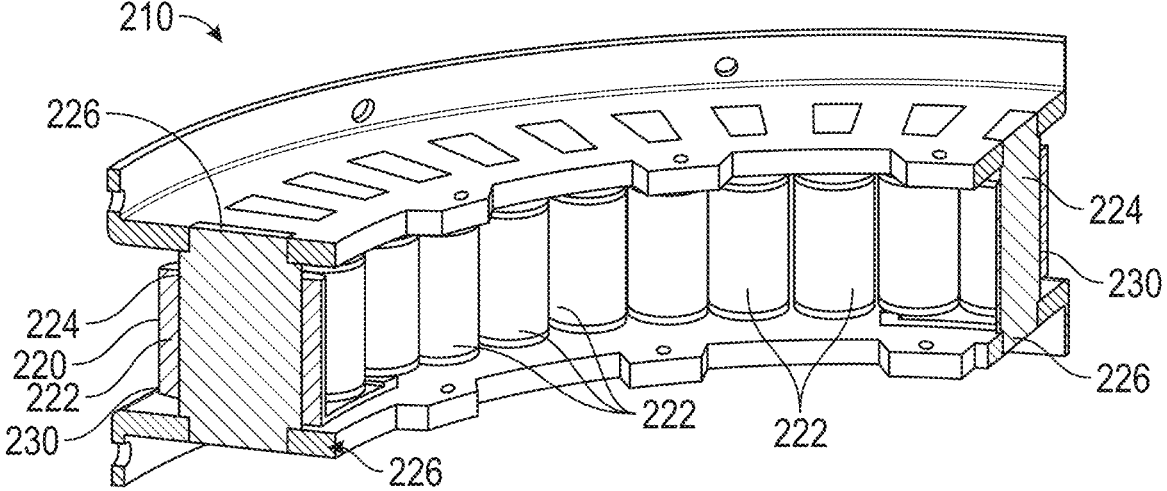
FIG. 9 is a partial, cross-sectional view of the composite stator of FIG. 8.

Referring to FIGS. 8-12, a composite stator 210 of an electric motor is shown in FIGS. 8 and 9. Particularly, in this exemplary embodiment, composite stator 210 comprises a stator of an axial-flux electric motor. For instance, in some embodiments, composite stator 210 comprises the stator 32 of the axial-flux electric motor 30 shown in FIG. 2. However, it may be understood that in other embodiments the composite stator 210 of FIGS. 8 and 9 could be utilized (e.g., via repositioning the magnets thereof) in radial-flux electric motors such as, for example, the radial-flux electric motor 10 shown in FIG. 1.

Composite stator 210 has a longitudinal or central axis 215 which is coincident with the rotational axis of the electric motor comprising composite stator 210. In this exemplary embodiment, composite stator 210 generally includes an annular stator electromagnet assembly 220 and a pair of annular composite support rings or disks 240. Stator electromagnet assembly 220 generally includes a plurality of electromagnets 222 circumferentially spaced around central axis 215. As shown particularly in FIG. 9, in this exemplary embodiment, electromagnets 222 each include an inner stator tooth 224 surrounded by electrically conductive windings 230. In some embodiments, the stator tooth 224 of each electromagnet 222 comprises an iron core. In addition, in this exemplary embodiment, the stator tooth 224 of each electromagnet 222 extends between longitudinally opposed ends defined by keys 226 of the stator tooth 224. As will be discussed further herein, keys 226 interface with support rings 240 of composite stator 210 to thereby couple the electromagnet assembly 220 with support rings 240.

The electromagnets 222 of stator electromagnet assembly 220 is sandwiched axially between the pair of support rings 240 which maintain the position of electromagnets 222 and provide structural support thereto. Particularly, support rings 240 resist bending and torsional loads applied to composite stator 210 during operation. For example, bending loads may result from the electromagnetic attraction between the magnets of a corresponding rotor (e.g., composite rotor 100 shown in FIGS. 3-5) and the stator 210. In addition, torsional loads may result due to the tangential force imparted on composite stator 210 as a result of the rotation of the magnets of the corresponding rotor during operation.

Figure 10:
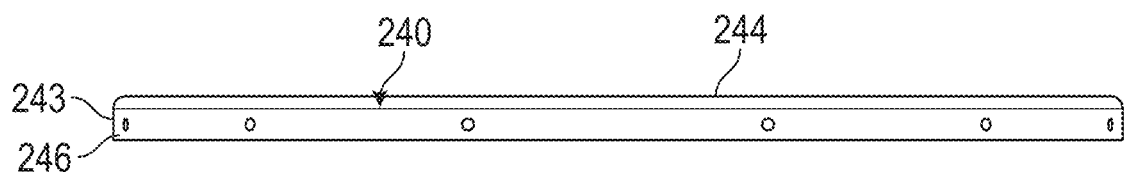
FIG. 10 is a side view of a composite support ring of the composite stator of FIG. 8 according to some embodiments.
Figure 11:
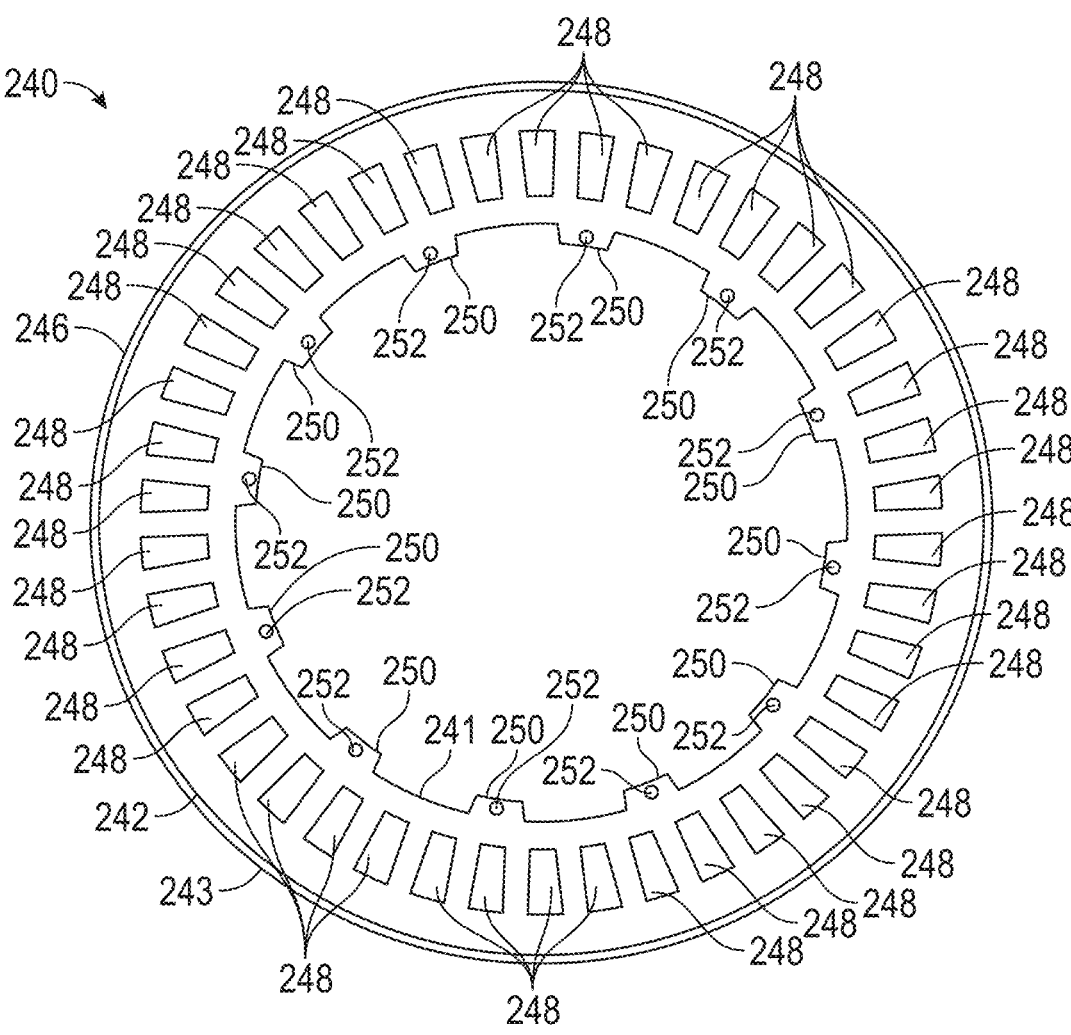
FIG. 11 is a top view of the composite support ring of FIG. 10.
Figure 12:
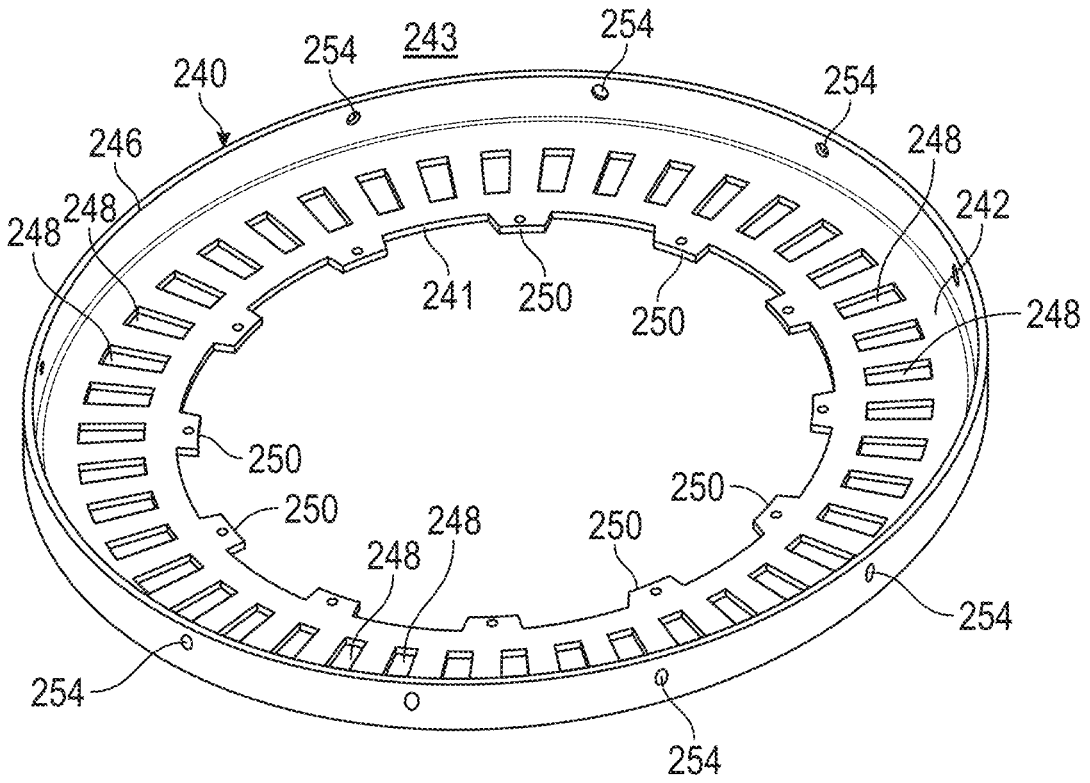
FIG. 12 is a perspective view of the composite support ring of FIG. 10.

As shown particularly in FIGS. 10-12, in this exemplary embodiment, each support ring 240 extends radially between a radially inner diameter 241 and an opposing radially outer diameter 243. Additionally, support ring 240 defines an annular external surface or endface 242 and an opposing annular internal surface or endface 244 where each surface 242 and 244 extends radially between inner diameter 241 and outer diameter 243 of the support ring 240. In this exemplary embodiment, an annular and axially extending outer hub or lip 246 of support ring 240 is formed along the outer diameter 243 thereof. Further, in this exemplary embodiment, each support ring 240 has a uniform cross-section (e.g., a cross-section that is not tapered) to maintain the tight tolerances and clearances required of the composite stator 210 and other components of the electric motor integrating the composite stator 210. As will be discussed further herein, composite stator 210 is formed from quasi-isotropic composite materials capable of providing the desired degree of stiffness without needing to rely on having a tapered cross-section to provide said stiffness which would otherwise make the composite stator 210 more difficult to manufacture.

Each support ring 240 includes a plurality of radially extending slots or receptacle 248 circumferentially spaced around the central axis 215 thereof. Slots 248 are elongate and generally quadrilateral in this exemplary embodiment; however, the geometry or shape of slots 248 may vary in other embodiments. The slots 248 of support rings 240 receive the keys 226 of stator teeth 224 to thereby couple the electromagnets 222 of stator electromagnet assembly 220 with the support rings 240. In some embodiments, an outer stator housing applies a compressive force to the composite stator 210 to retain the keys 226 of stator teeth 224 in their respective slots 248 of support rings 240.

In this exemplary embodiment, each support ring 240 additionally includes a plurality of mounting tabs 250 and a plurality of radially outer mounting holes 254 (a few of which are shown in FIG. 12) each circumferentially spaced around the central axis 215 of the support ring 240. Particularly, mounting tabs 250 are positioned along the inner diameter 241 of each support ring 240 such that the mounting tabs 250 project radially inwards towards central axis 215. In addition, each mounting tab 250 is provided with a radially inner mounting hole 252 which may receive a fastener for coupling the respective support ring 240 to an external support structure such as, for example, a housing of an electric motor that comprises the composite stator 210. Similarly, the outer mounting holes 254, which are spaced circumferentially along the outer lip 246 of each support ring 240 may similarly receive a fastener for coupling the respective support ring 240 to an external support structure.

As described above, support rings 240 each comprise a composite material such as a carbon fiber material. In this exemplary embodiment, the composite material comprising support rings 240 is a quasi-isotropic laminate material formed from a composite layup with fibers following a cylindrical coordinate system. In other words, at least some of the fibers of the quasi-isotropic composite material forming each support ring 240 comprise circumferential fibers that extend entirely around the central axis 215 of composite stator 210. Additionally, at least some of the fibers of the quasi-isotropic composite material comprise radial fibers that extend in a radial direction (orthogonal to the circumferential fibers) relative to the central axis 215 between the inner diameter 241 and outer diameter 243 of the given support ring 240.

In some embodiments, each support ring 240 comprises a unibody ring or disk (e.g., rings 240 are not formed from several different arcuate disk-segments which are coupled together to form the annular structure of the ring 240). Support rings 240 may comprise a unibody structure through the use of a combination of continuous and discontinuous fibers (e.g., carbon fibers) stacked in a flat, disk-like structure.

The mixture of continuous and discontinuous fibers in the composite material forming each support ring 240 ensures efficient load transfer while maintaining ease of manufacturing and avoiding the use of overly-draped plies that may compromise mechanical performance. For example, discontinuity in the discontinuous fibers may be introduced by using relatively small sections of plies to cover the entire circular cross section of the given support ring 240. These small sections overlaps to ensure load transfer between the discontinuous fibers in the given overlapping region, compensating for the loss of strength due to draping in the continuous fibers. For the continuous fibers, these fibers extend completely around the central axis 215 in the circumferential direction in a single ply. Conversely, the discontinuous fibers extend only over a portion (e.g., they extend arcuately) of the circumference of the given support ring 240 (e.g., (1/10)*360°) and are laid adjacent to similar fibers. Thus, in an example, 10 sections of discontinuous fibers are laid on the same plane representing a ply. In addition, in certain embodiments, the fibers of composite material forming each support ring 240 are intentionally draped around the slots 248 formed therein so as to ensure uniform stress distribution and to prevent ply decohesion during operation of the composite stator 210.

In some embodiments, the composite material of support rings 240 comprises a carbon fiber reinforced epoxy (CFRE) structure specifically configured to sustain the high thermal loading to which composite stator 210 is subjected in at least some applications. Particularly, conventional epoxies are typically rated only up to approximately 350 degrees Fahrenheit (° F.), a temperature that is often significantly less than the operating temperature of stators utilized in electric motors. This issue is overcome in some embodiments by using an intermediate-modulus carbon fiber unitape impregnated with a custom epoxy resin capable of withstanding temperatures upwards of 500° F.

Figure 13:
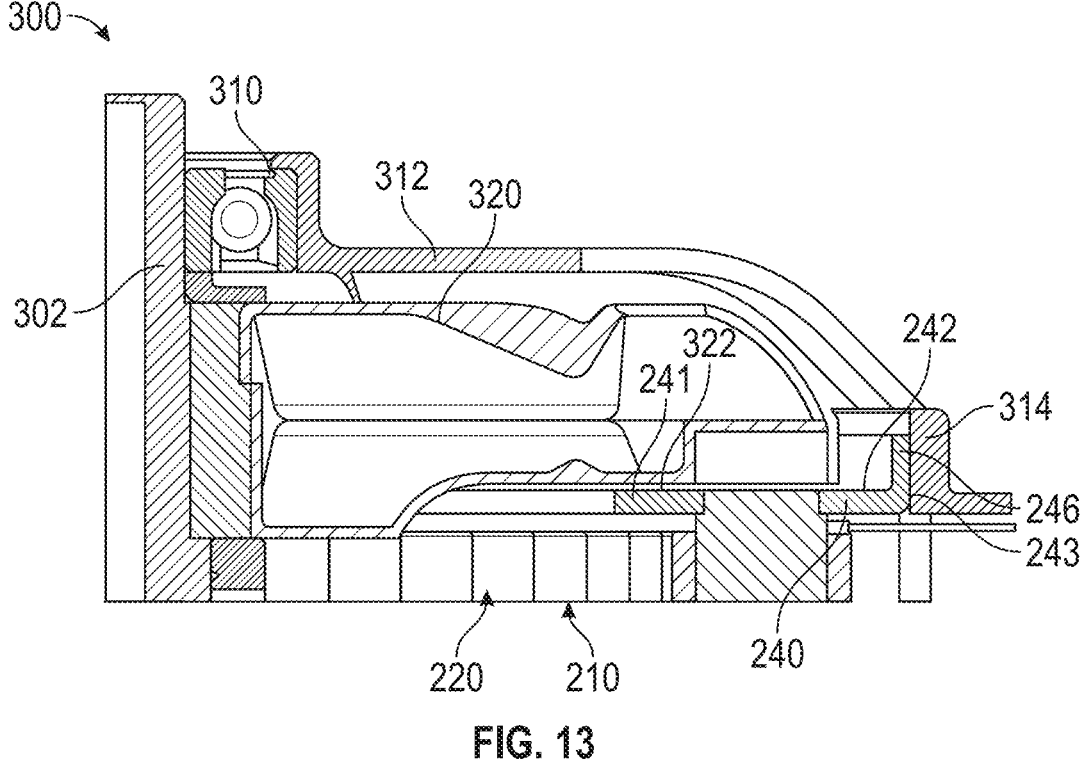
FIG. 13 is a side cross-sectional view of an electric motor according to some embodiments.

Referring to FIG. 13, an axial-flux electric motor 300 is shown according to some embodiments. Electric motor 300 generally includes a central output shaft 302, a bearing assembly 310, an annular stator housing 320, and the stator 210. Output shaft 302 defines a rotational axis of electric motor 300 and is rotatably supported by the bearing assembly 310 such that output shaft 302 is permitted to rotate about the rotational axis relative to stator 210. Particularly, the bearing assembly comprises an annular inner bearing race coupled to the output shaft 302, an annular outer bearing race coupled to the stator 210, and a plurality of bearing elements positioned between the inner and outer bearing races such that relative rotation is permitted between the inner and outer bearing races.

In this exemplary embodiment, electric motor 300 includes a bearing mount 312 that is coupled between the outer bearing race of bearing assembly 310 and the stator 210. Particularly, bearing mount 312 includes a mounting surface 314 that mounts to the lip 246 of one of the support rings 240 of stator 210. In addition, the stator housing 320 of electric motor 300 comprises a mounting surface 322 that mounts to the mounting tabs 250 of one of the support rings 240 of stator 210.

In addition to stator 210, in some embodiments, electric motor 300 of FIG. 13 comprises the composite rotor 100 shown in FIGS. 3-5. Particularly, rotor 100 may be positioned axially adjacent stator 210 and mounted to the output shaft 302 such that relative rotation about the rotational axis of electric motor 300 between output shaft 302 and rotor 100 is restricted. In this manner, electrical power may be supplied to the electromagnets 222 of stator 210 to generate an axially-directed (e.g., extending parallel the rotational axis of electric motor 300) magnetic flux between the electromagnets 222 of stator 210 and the magnets 150 of rotor 100. The magnetic flux generated between stator 210 and rotor 100 may, in-turn, apply a rotational torque against rotor 100 about the rotational axis of composite rotor 100 that results in rotation of output shaft 302 about the rotational axis.

Figure 14:
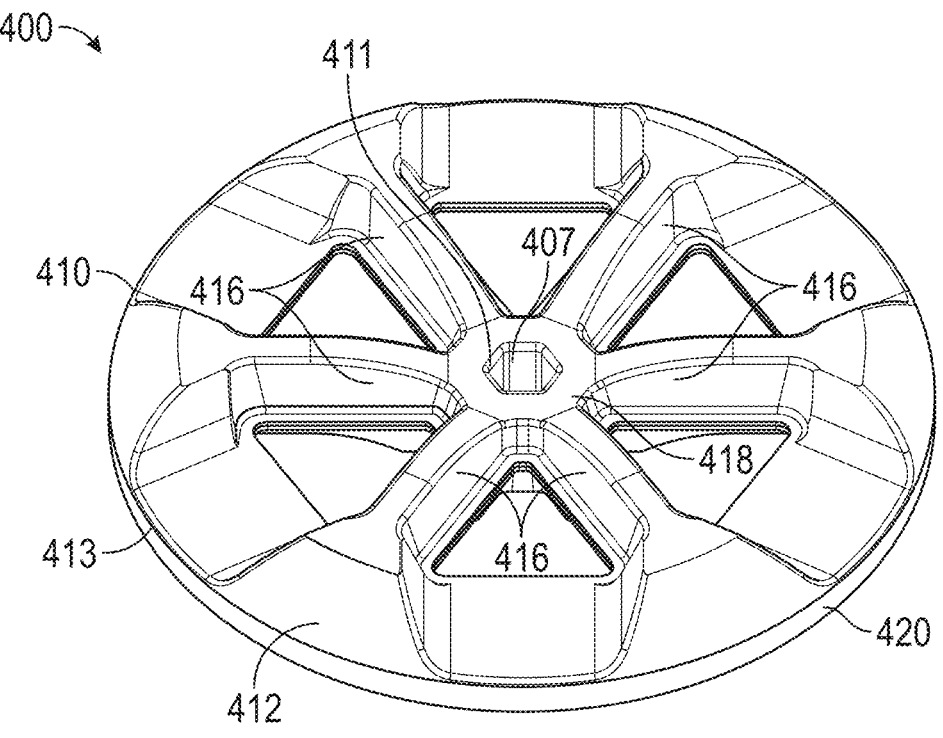
FIG. 14 is a perspective view of another composite rotor for an electric motor according to some embodiments.
Figure 15:
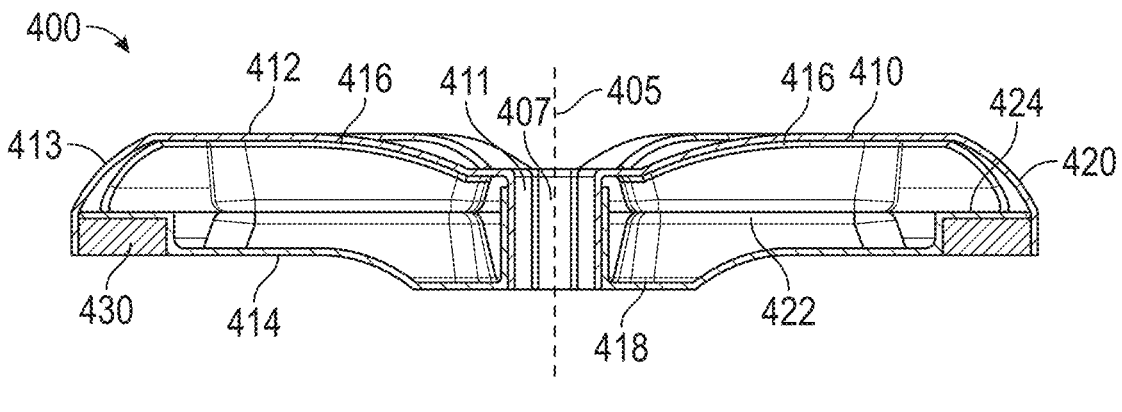
FIG. 15 is a side cross-sectional view of the composite rotor of FIG. 14.
Figure 16:
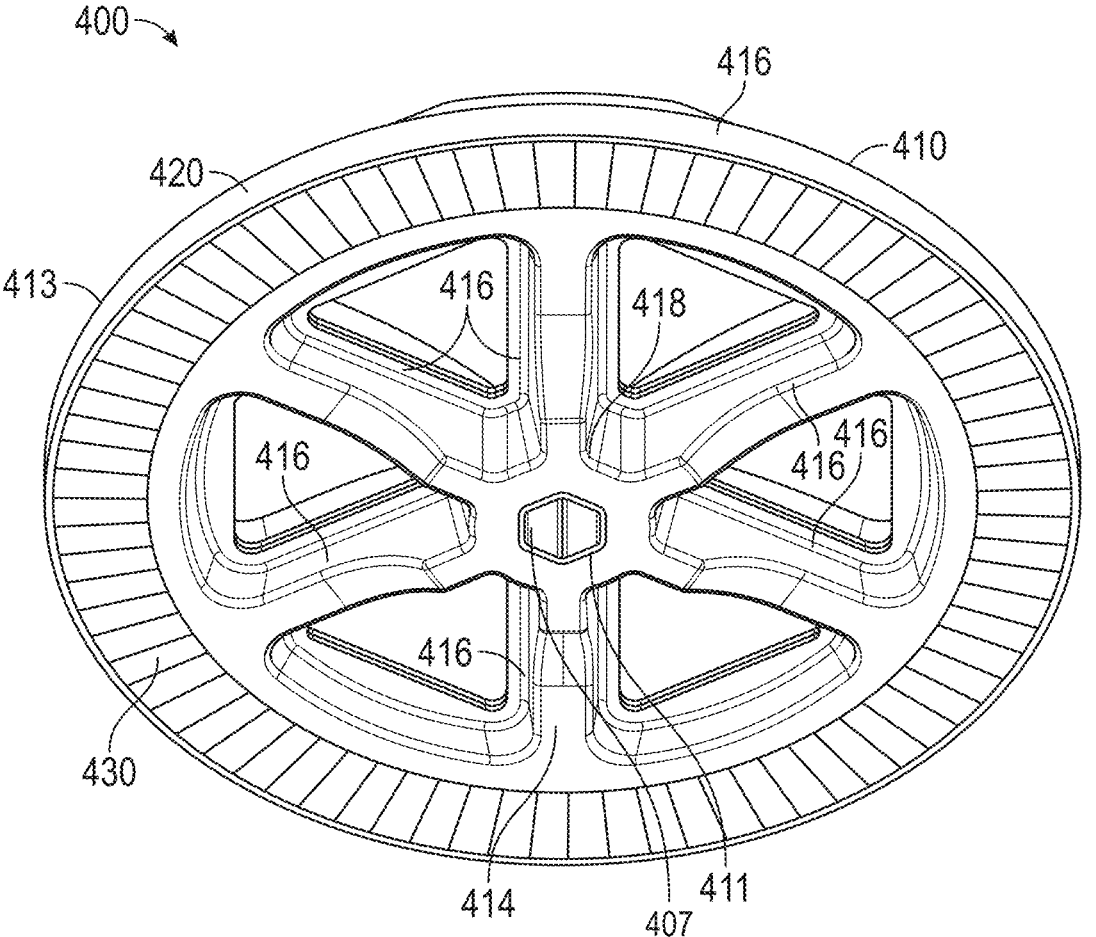
FIG. 16 is another perspective view of the composite rotor of FIG. 14.

Referring now to FIGS. 14-16, another embodiment of a composite rotor 400 is shown. Composite rotor 400 has a longitudinal or central axis 405 which is coincident with the rotational axis of the electric motor comprising composite rotor 400. In addition, composite rotor 400 defines a central passage 407 extending centrally and longitudinally through composite rotor 400 coaxial with central axis 405. In this exemplary embodiment, composite rotor 400 generally includes an annular support frame 410 In some embodiments, support frame 410 may be formed from a pair of annular support plates that are coupled together while in other embodiments support frame 410 comprise a unitary or monolithically formed structure. In addition, support frame 410 is formed from a composite material (e.g., a carbon fiber material) such as a quasi-isotropic composite material. In some embodiments, the composite material forming support frame 410 may be formed from the composite layup 190 shown in FIG. 6.

Particularly, support frame 410 extends radially between a radially inner diameter 411 and an opposing radially outer diameter 413. Additionally, support frame 410 defines an annular first surface or endface 412 and an opposing second surface or endface 414 where each surface 412 and 414 extends radially between inner diameter 411 and outer diameter 413 of support frame 410. In this exemplary embodiment, support frame 410 defines a plurality of spokes 416 circumferentially spaced around the central axis 405 and which extend radially between an annular inner hub 418 and an annular outer hub 420 of the support frame 410. Spokes 416 provide structural support to the support frame 410 permitting the support frame 410 to resist bending loads applied thereto.

An inner chamber 422 is formed within the support frame 410 which extends through the spokes 416, inner hub 418, and outer hub 420. In some embodiments, the inner chamber 422 is left vacant (e.g., such that is filled with ambient air) to minimize the weight of support frame 410. In other embodiments, inner chamber 422 is at least partially filled with an internal core, such as a foam core, to enhance the structural rigidity of support frame 410.

In addition to support frame 410, composite rotor 400 additionally includes a plurality of magnets 430 positioned circumferentially around the central axis 405 of composite rotor 400. Particularly, in this exemplary embodiment, magnets 430 are received in an annular groove 424 formed along the second surface 414 of support frame and located along the outer hub 420 of support frame 410. In this manner, the plurality of magnets 430 are coupled to the second surface 414 of support frame 410.

While embodiments of the disclosure have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A composite rotor for an electric motor, the composite rotor comprising:

an annular composite support frame comprising an annular composite support plate extending radially relative to a central axis of the composite rotor between an inner diameter defining a central opening of the composite support plate and an outer diameter, wherein the composite support plate comprises a composite material formed of a quasi-isotropic laminate having a plurality of separate plies of woven fabric oriented at non-zero angles to each other; and an annular magnet assembly extending around the central axis of the composite rotor and coupled to a surface of the composite support plate.

2. The composite rotor of claim 1, wherein the quasi-isotropic laminate comprises one or more first plies oriented at a first angle relative to a layup axis of the quasi-isotropic laminate and one or more second plies stacked sandwiched between the one or more first plies along the layup axis and oriented at a second angle relative to the layup axis that is different from the first angle.

3. The composite rotor of claim 2, wherein the first angle comprises 0° and the second angle comprises 45°.

4. The composite rotor of claim 1, wherein the composite support plate comprises a spokeless external surface extending circumferentially entirely around the central axis and entirely from the inner diameter to the outer diameter, and wherein the external surface is free of any openings.

5. The composite rotor of claim 1, wherein:
the composite support plate comprises a first composite support plate of the composite rotor and the quasi-isotropic laminate comprises a first quasi-isotropic laminate;
the composite rotor further comprises an annular second composite support plate coupled to the first composite support plate and extending radially between an inner diameter defining a central opening of the second composite support plate and an outer diameter of the second composite support plate, wherein the second composite support plate comprises a second quasi-isotropic laminate; and
an annular chamber is formed between the first composite support plate and the second composite support plate that extends circumferentially entirely around the central axis of the composite rotor.

6. The composite rotor of claim 5, wherein the chamber is filled with an annular foam core.

7. The composite rotor of claim 1, wherein the magnet assembly comprises an annular mounting bracket, an annular retaining ring, and one or more magnets positioned radially between the mounting bracket and the retaining ring.

8. The composite rotor of claim 7, wherein the retaining ring comprises a composite material with unidirectional fibers.

9. The composite rotor of claim 1, wherein the quasi-isotropic laminate comprises carbon fiber.

10. The composite rotor of claim 1, wherein the composite support frame defines a plurality of spokes circumferentially spaced around the central axis of the composite rotor with fibers of a composite material of the composite support frame extending radially relative to the central axis of the composite rotor.

11. A composite stator for an electric motor, the composite stator comprising:
an annular composite support ring extending radially relative a central axis of the composite stator between an inner diameter defining a central opening of the composite support ring and an outer diameter, wherein the composite support ring comprises a composite material formed of a quasi-isotropic laminate having a plurality of separate plies of woven fabric oriented at non-zero angles to each other; and
an annular electromagnet assembly extending around the central axis of the composite stator and coupled to a surface of the composite support ring.

12. The composite stator of claim 11, wherein:
the composite support ring comprises a plurality of slots circumferentially spaced around the central axis of the composite stator; and
the electromagnet assembly comprises a plurality of electromagnets circumferentially spaced around the central axis of the composite stator, wherein each electromagnet comprises an outer electrically conductive winding and an inner stator tooth comprising a first key that is received in a slot of the plurality of slots of the composite support ring.

13. The composite stator of claim 12, wherein:
the composite support ring comprises a first composite support ring of the composite stator and the quasi-isotropic laminate comprises a first quasi-isotropic laminate; and
the composite stator further comprises an annular second composite support ring whereby the electromagnet assembly is coupled between the first composite support ring and the second composite support ring, wherein the second composite support ring extends radially between an inner diameter defining a central opening of the second composite support ring and an outer diameter of the second composite support ring, and wherein the second composite support ring comprises a second quasi-isotropic laminate.

14. The composite stator of claim 13, wherein the second composite support ring comprises a plurality of slots circumferentially spaced around the central axis of the composite stator, and wherein the stator tooth of each electromagnet of the electromagnet assembly comprises a second key, longitudinally opposite the first key of the stator tooth, that is received in a slot of the plurality of slots of the second composite support ring.

15. The composite stator of claim 11, wherein the composite support ring comprises a plurality of mounting tabs positioned along the inner diameter and circumferentially spaced around the central axis of the composite stator.

16. The composite stator of claim 11, wherein the quasi-isotropic laminate comprises a mixture of continuous fibers and discontinuous fibers.

17. The composite stator of claim 11, wherein the quasi-isotropic laminate comprises an epoxy resin having a working temperature of up to at least 500 degrees Fahrenheit.

18. The composite stator of claim 11, wherein the quasi-isotropic laminate comprises one or more first plies oriented at a first angle relative a layup axis of the quasi-isotropic laminate and one or more second plies stacked sandwiched between the one or more first plies along the layup axis and oriented at a second angle relative to the layup axis that is different from the first angle.

19. An electric motor, comprising:
an annular composite rotor comprising an annular composite support plate and an annular rotor magnet assembly coupled to the composite support plate;
an annular composite stator comprising a pair of annular composite support rings and a stator electromagnet assembly coupled between the pair of composite support rings; and
an output shaft defining a rotational axis of the electric motor and extending through the composite stator and the composite rotor, wherein the output shaft is permitted to rotate about the rotational axis relative to the composite stator but is rotationally locked to the composite rotor;
wherein the electric motor is configured to generate a magnetic flux between the stator electromagnet assembly and the rotor magnet assembly to drive rotation of the output shaft about the rotational axis.

20. The electric motor of claim 19, wherein both the composite rotor and the composite stator comprise a composite material formed of a quasi-isotropic laminate.

* * * * *